United States Patent
Davis et al.

(10) Patent No.: US 8,412,151 B2
(45) Date of Patent: Apr. 2, 2013

(54) PAYBACK CALLING PLAN

(75) Inventors: Keith Davis, Cumming, GA (US); Keith Chung, Mableton, GA (US); Jaime Buckley, Duluth, GA (US); Adit Uppal, Alpharetta, GA (US); Mike Pacifico, Duluth, GA (US); David Pugliese, Milton, GA (US)

(73) Assignee: Cox Communications, Inc., Atlanta, GA (US)

( * ) Notice: Subject to any disclaimer, the term of this patent is extended or adjusted under 35 U.S.C. 154(b) by 747 days.

(21) Appl. No.: 12/504,259

(22) Filed: Jul. 16, 2009

(65) Prior Publication Data

US 2011/0014893 A1   Jan. 20, 2011

(51) Int. Cl.
| H04M 11/00 | (2006.01) |
| H04M 15/00 | (2006.01) |
| G06F 15/02 | (2006.01) |
| G06F 21/00 | (2006.01) |
| G06F 7/04 | (2006.01) |
| G06F 15/16 | (2006.01) |
| G06F 17/30 | (2006.01) |
| G07C 1/10 | (2006.01) |
| G06Q 40/00 | (2012.01) |
| H04N 7/167 | (2011.01) |
| H04L 29/06 | (2006.01) |

(52) U.S. Cl. ........ 455/405; 455/406; 455/407; 455/408; 379/111; 379/112.01; 379/112.06; 379/112.07; 379/114.01; 379/114.03; 705/32; 705/40; 705/52; 380/231; 380/233; 726/7

(58) Field of Classification Search .......... 455/405-406; 379/111, 112.01, 112.06, 112.07, 114.01, 379/114.03; 705/32, 40, 52; 405/405-408; 380/231, 233; 726/7
See application file for complete search history.

(56) References Cited

U.S. PATENT DOCUMENTS

| 6,424,706 | B1 * | 7/2002 | Katz et al. ................. 379/144.01 |
| 6,615,034 | B1 | 9/2003 | Alloune et al. |
| 2004/0009762 | A1 | 1/2004 | Bugiu et al. |
| 2009/0061817 | A1 | 3/2009 | Barksdale et al. |
| 2009/0068984 | A1 * | 3/2009 | Burnett ......................... 455/408 |
| 2009/0070263 | A1 | 3/2009 | Davis et al. |

FOREIGN PATENT DOCUMENTS

WO   WO2004015973   2/2004

\* cited by examiner

Primary Examiner — Anthony Addy
Assistant Examiner — Munsoon Choo
(74) Attorney, Agent, or Firm — Benjamin A. Balser; Balser & Grell IP Law

(57) ABSTRACT

A method for paying back customers for unused service units remaining after a billing cycle. A payback amount is determined by the product of the number of unused service units remaining and the payback rate amount. The payback amount credited to the customer is the calculated payback rate or a maximum payback amount, wherever is smaller. A total payback amount can be determined based on a combination of payback amounts for various services, including voice services, texting services, email services, and/or data storage services.

15 Claims, 3 Drawing Sheets

PAYBACK CALLING PLAN

TECHNICAL FIELD

The disclosed embodiments are directed to a system and method for paying back customers for unused service units remaining after a billing cycle. More particularly, the disclosed embodiments relates to a wireless calling plan that pays back customers for unused minutes, or other perishable service units, remaining at the end of billing cycle.

BACKGROUND OF THE ART

In a typical service plan such as a wireless calling plan, customers generally purchase a predetermined number of service units (e.g., minutes) per billing cycle. For example, a wireless phone customer may sign up for a billing plan costing $50 for 2000 minutes per month. With typical service plans, any unused service units at the end of the billing cycle are lost or they expire. This type of plan can be frustrating for the customer who consistently loses unused service minutes that they have paid for.

U.S. Pat. No. 7,457,777 provides one option for unused service units by "rolling over" unused service units at the end of the billing cycle. This option may not be completely satisfactory for many customers because the customer never receives money back for unused service units. Furthermore, if the customer accumulates a large amount of unused service units over time, the customer may lose the benefits of these service units if the customer moves to another service provider at the end of the calling plan.

Accordingly, there is a need for a system that implements a service plan that pays money back to the customer for unused service units remaining at the end of a billing cycle.

In one embodiment, the calling plans provides a predetermined number of service units per billing cycle. In another embodiment, the customer deposits money into a cash account which is used to pay for service units as they are used.

In one embodiment, the total "payback" amount is calculated by multiplying the total number of unused minutes times a predetermined payback rate. In the preferred embodiment, the customer is paid back the calculated payback amount or a set maximum payback amount, whichever is the smaller amount.

The total payback amount can be based on one type of perishable service unit (e.g., minutes) or it can be based on a combination of a plurality of service unit types. For example, in one embodiment, the total payback amount will be calculated based on combination of the number of unused calling minutes, unused text messages, unused emails, unused data or data storage (e.g., Mb or kb), and/or unused Internet service units. It is appreciated that the payback rate applied to each of these types of service units may vary.

SUMMARY OF THE GENERAL INVENTIVE CONCEPT

The preferred embodiment of the invention is comprised of a system and method for providing a credit back to a customer, comprising:

i) at least one database, the database configured with service plan details including perishable service units for a first service type allocated to a customer per billing cycle, the database also configured with a payback rate amount for the first service type, and a maximum payback amount for the first service type;

ii.) at least one processing system for tracking the number of used service units for the first service type, the processing system configured to calculate the service units of the first service type remaining at the end of a billing cycle and to calculate a calculated payback amount for the first service type by multiplying the number of remaining service units of the first service type with the payback rate amount for the first service type; and iii.) wherein the processing system is configured to determine a payback amount for the first service type by taking the smaller of the calculated payback amount for the first service type and the maximum payback amount for the first service type.

In one embodiment, the first service type is voice calling services and the service units of the first service type is voice minutes. In an alternative embodiment, the database is configured with perishable service units for a second service type allocated to a customer per billing cycle, the database also configured with a payback rate amount for the second service type, and a maximum payback amount for the second service type; and where the processing system is adapted to track the number of used service units for the second service type and calculate the service units of the second service type remaining at the end of a billing cycle.

A calculated payback amount for the second service type is determined by multiplying the number of remaining service units of the second service type with the payback rate amount for the second service type. The processing system is configured to determine a payback amount for the second service type by taking the smaller of the calculated payback amount and the maximum payback amount for the second service type. A total payback amount is determined by adding the payback amounts for the first and second service types. The second service type can be text messaging services, email messaging services, Internet services, or data storage services. In the preferred embodiment, an invoice is cut for the customer with a credit applied in the amount of the total payback amount.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
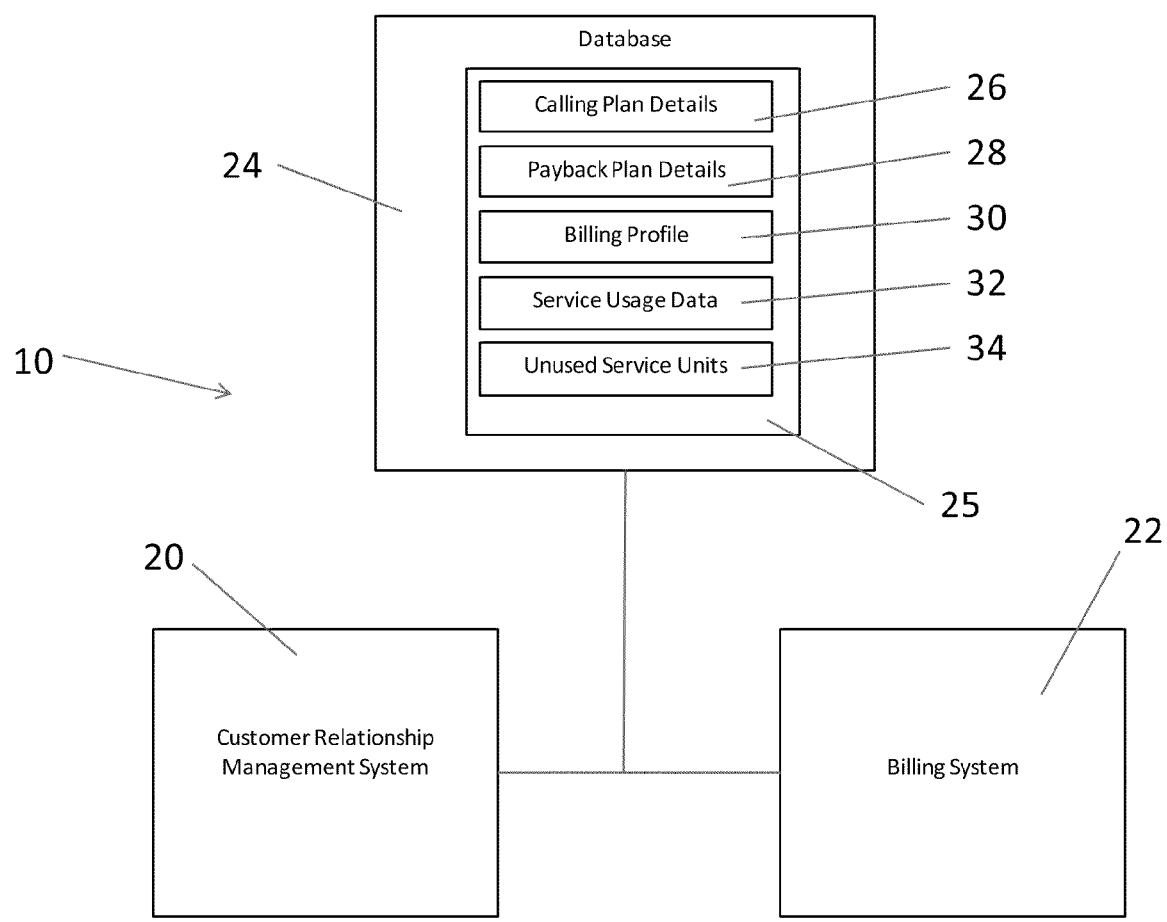
FIG. 1 illustrates one embodiment of the payback system of the present invention.

FIG. 1 illustrates one embodiment of the payback system 10 of the present invention. The system is comprised of a customer relationship management processing system (CRM) 20, a billing system 22, and a database 24. The database is comprised of a plurality of customer data files, each data file for specific customers 25 comprising data relating to calling plan details 26, payback plan details 28, billing profile 30, service usage data 32 and data relating to unused service units 34.

It is appreciated that the CRM processing system and the billing system may be separate processing systems or may be combined into one system. It is also appreciated that the database storing the relevant data can be one database or may be separated into multiple databases. For example, data relating to a customer may be spread across multiple databases.

In the preferred embodiment, the CRM processing system is adapted to track, manage, and organize customer contact information. Information relating to customers can be entered and accessed through the CRM system. In the preferred embodiment, the billing system of the present invention is adapted to manage, store, and organize billing information for service customers. In the preferred embodiment, the billing system is configured with the billing algorithms and has access to the billing and usage data necessary to determine the payback amount for each customer. Billing information, including customer billing profiles, may be entered and accessed through the CRM system.

In one embodiment, the calling plan details stored in the database is comprised of the number of minutes per month available under the calling plan, the cost of the plan, the number of text messages per month available under the plan, the Internet service available to the customer, value-added services subscribed to by the customer such as unlimited calls after 7:00 pm or unlimited weekend calling, the cost of service usage over the plan allocations, the cost of one-time charges, the cost of the value-added services, and other optional features the customer has subscribed to with their associated costs, for example, navigation features.

If the calling plan is a cash deposit plan where the customer is charged as the service is used according to predetermined or varying rates, the calling plan details will have data relating to the service rate charges that will be assessed against the customer as the services are used. Under this option, the customer makes a cash deposit at the beginning of each month that is used to pay for the service charges as they are incurred during the month. At the end of the month, if there is a remaining positive cash deposit balance (i.e., all of the deposit has not been used), the balance, or a portion of the balance, may be paid back to the customer at the end of the billing cycle or the remaining deposit amount may be carried forward into the next billing cycle. If the remaining balance is to be paid back to the customer, a check may be sent to the customer or a credit may be applied on the customer's next invoice.

In one embodiment, the payback plan details stored in the database is comprised of the payback rate amount that will be applied to unused service units remaining at the end of the billing cycle (preferably, for each type of service), the maximum payback amount per month (for each type of service). For example, for a particular customer, the payback rate amount for voice services might be five cents a minute with a maximum payback amount for voice calling services of $10 per billing cycle. As another example, the payback rate amount for text messages might be 2 cents per unused text message with a maximum payback amount for text messages of $5 per billing cycle. It is appreciated that the total payback amount may be calculated based on just the unused voice calling minutes or it may be a sum of a combination of a number of different service types (for example, the total payback amount might be the sum of the payback from unused voice minutes and the payback amount from unused text messages). The payback rate may stay the same for the entire calling plan or it may be changed during the calling plan. The payback rate amount will generally be different for different service types and may change across billing plans.

In one embodiment, the billing profile data stored in the database is comprised of data identifying the customer and other relevant personal information. For example, the billing profile may be comprised of the customer's name, address, phone number, account number, and PIN number.

In one embodiment, the service usage data stored in the database is comprised of the number of service units used by a particular customer for a particular billing cycle. For example, for any given customer, the service usage data might include the number of voice calling minutes used during the billing cycle, the number of text messages sent, the number of emails sent, the number of text messages sent, the time spend on the Internet, the amount of data used, the number of times the navigation feature was used, and/or the number of times the 411 service was used. In one embodiment, the billing system obtains the usage data from voice and data switches.

In one embodiment, the unused service unit data stored in the database relates the amount of unused service units remaining for each customer after each billing cycle. The amount of unused service units can be calculated for every applicable service category including voice calling minutes, text messages, emails, Internet access, data storage. The amount of unused service minutes is calculated by subtracting the usage information for each service from the total amount of service units allocated to the customer for each billing cycle. So for example, if the customer's calling plan allocated 2000 minutes per month of voice calling minutes, and the particular customer used 1500 minutes that month, that customer would have 500 unused voice calling service units (or minutes) that month. In one embodiment, the number of unused service units is calculated on a running basis throughout the billing cycle or it may also be calculated once at the end of each billing cycle.

In the preferred embodiment, the payback plan will apply to all voice calling plans with the exception being unlimited plans. In one embodiment, customers who subscribe to a wireless plan with a payback plan will be notified of the plan's maximum credit back amount (per monthly billing cycle). The maximum credit back amount will vary depending on the selected plan (e.g., a $40 plan may have a $5 credit back maximum whereas a $60 plan may have a credit back maximum of $10).

In the preferred embodiment, the customer will also be notified of the plan's "Anytime" minute allocation and the value of each unused "Anytime" minute. ("Anytime" minutes are the perishable voice minutes that are not part of any unlimited calling times.) For example, the calling plans may provide minutes that do not count towards the Anytime minute allocation (e.g. Nights/Weekend minutes where calls after 7 PM and before 6 AM from Monday through Friday and all day Saturday and Sunday will not count towards the Anytime minutes used) and hence usage of these minutes will not impact the customer's allotted Anytime minutes nor will it impact the customer's credit back amount.

Example Offers and Credit Back Treatment

Offer A: 400 Anytime minutes with unlimited nights/weekend (calls placed between 7 PM and 6 AM Monday through Friday and all day Saturday and Sunday will not count towards the 400 Anytime minutes). Maximum credit back amount: $5 per billing cycle. Customer will receive $0.05 credit back for each unused Anytime minute up to the maximum credit back amount.

Offer B: 800 Anytime minutes with unlimited nights/weekend. Maximum credit back amount: $10 per billing cycle. Customer will receive $0.05 credit back for each unused Anytime minute up to the maximum credit back amount.

Scenario 1: Customer subscribes to Offer A. During the billing cycle period the customer uses 399 Anytime minutes and 800 nights/weekend minutes. Since the customer has 1 unused anytime minute then the customer will receive a credit back amount of 1×$0.05 on their next bill. Only the Anytime minutes used impacts the credit back amount.

Scenario 2: Customer subscribes to Offer B. During the billing cycle period the customer uses 200 Anytime minutes and 2000 nights/weekend minutes. Since the customer has 600 unused Anytime minutes then the customer will receive the lesser of 600×$0.05 or $10 (plan's maximum credit back). In this case the customer receives $10 credit back on their next bill. Only the Anytime minutes used impacts the credit back amount.

Algorithm Summary In one embodiment, the payback algorithm of the present invention is comprised of the following (see FIG. 2):

1. For a given service type, accumulate the customer's total perishable service units used within the billing cycle 36.
2. Subtract the total perishable service units used from the plan's provided monthly service units 38.
3. Multiply result of #2 by the service plan's specified payback rate per unused service unit amount 40.
4. Compare result of #3 with the service plan's specified maximum payback amount 42.
5. The payback provided to the customer is the smaller of the two values compared in step #4 44.

In the preferred embodiment, the credit back ("payback") amount is then subtracted from the monthly charges which, in one embodiment, may be the sum of monthly recurring charges ("MRC"), valued-added usage charges, one-time charges, and overage usage charges. Once the monthly bill for the customer is calculated the invoice is then cut.

Figure 2:
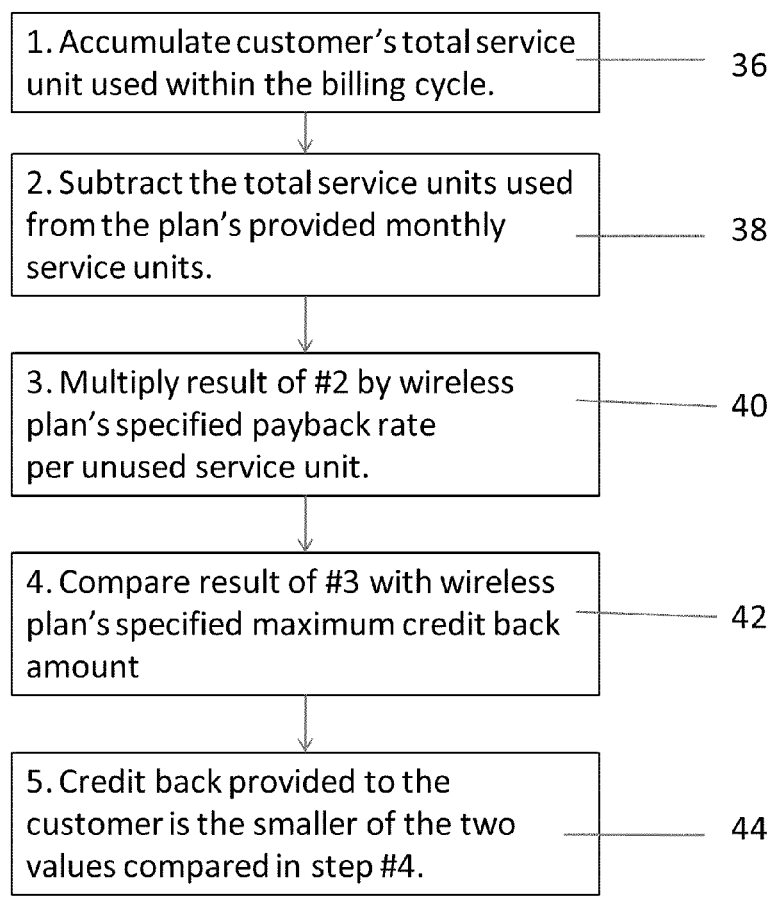
FIG. 2 illustrates one example flow chart of the process flow of the present invention.

In one embodiment, the payback algorithm of FIG. 2 is only applied to one service type, e.g., voice calling minutes. In another embodiment, the total payback amount is the sum of the payback amounts calculated for a plurality of service types. For example, the total payback amount can be calculated based on combination of the number of unused calling minutes, unused text messages, unused emails, unused data or data storage (e.g., Mb or kb), and/or unused Internet service units. It is appreciated that the payback rate applied to each of these types of service units may vary.

As one example, the total payback amount could be calculated from a combination of the payback amount for voice calling services and the payback amount for texting services. In this scenario, the payback algorithm of FIG. 2 is applied to all of the applicable service types having the payback feature, and the total payback amount is the sum of all the calculated payback amounts for each service type. For example, the payback amount for voice calling services might be $6.00, the payback amount for texting services might be $4.00 and so the total payback amount for the month would be the sum of these amounts or $10.00. In one embodiment, the total payback amount provided to the customer is the sum of the payback amounts or a maximum total payback amount, whichever is smaller.

Figure 3:
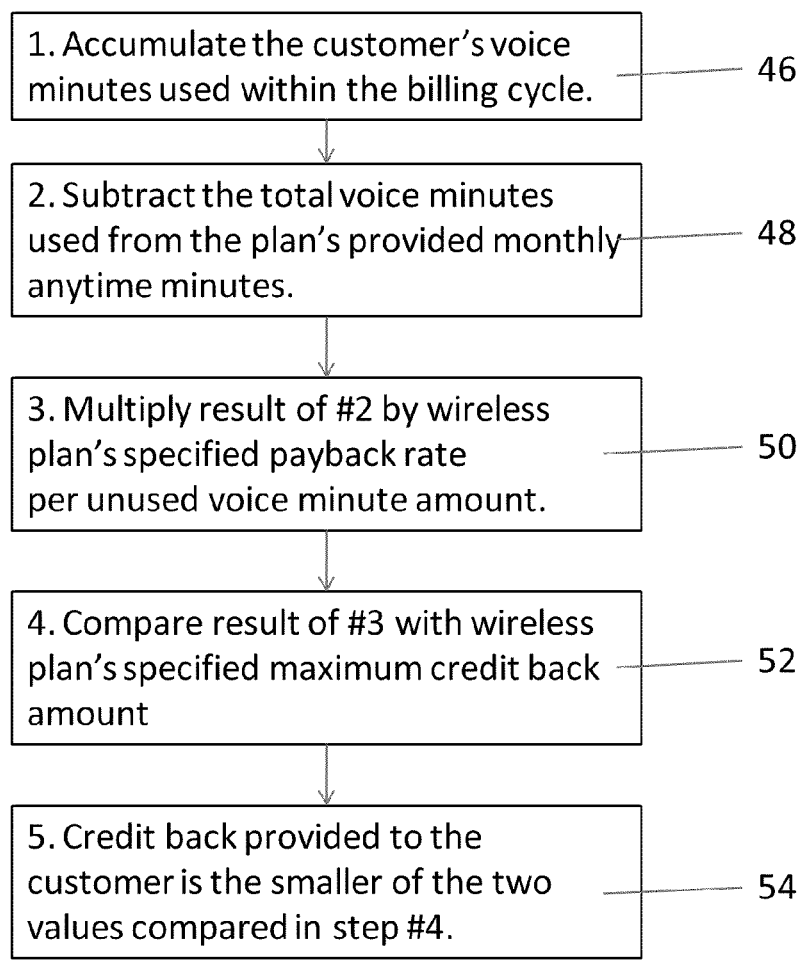
FIG. 3 illustrates another example flow chart of the process flow of the present invention.

FIG. 3 illustrates one embodiment of the payback algorithm of the present invention as applied to voice calling services. In this embodiment, the payback algorithm is preferably comprised of the following:

1. Accumulate the customer's total perishable voice minutes used within the billing cycle 46 (in the preferred embodiment, the total perishable voice minutes is just the total Anytime minutes).
2. Subtract the total perishable voice minutes used from the plan's provided monthly perishable voice minutes 48.
3. Multiply result of #2 by the calling plan's specified payback rate per unused voice minute amount 50.
4. Compare result of #3 with the calling plan's specified maximum payback amount 52.
5. The payback provided to the customer is the smaller of the two values compared in step #4 54.

In one embodiment, the payback rate applied to the unused service units is the same as the rate at which the service units were purchased. In another embodiment, the payback rate applied to the unused service units is lower than the rate at which the service units were purchased. In another embodiment, the payback rate applied to the unused service units is higher than the rate at which the service units were purchased.

IT Implementation Detail of One Embodiment of the Invention

In one embodiment, the payback algorithm of the present invention may be implemented using the combination of the CRM system and the billing engine. The payback results are then displayed using various presentation layers available for sending invoices to customers, e.g., paper invoices, on-line invoices, email invoices.

The following is one example sequence used to capture a customer order and to the customer profile with the payback type rate plan:

1. The order is initialized in the CRM system (e.g., a Siebel or Oracle system) with a requisite payback plan as the preferred discounting scheme with the details of the payback plan preferably pre-configured in the Product Catalog (e.g. plan details) of the Billing and the CRM system separately;
2. This plan is preferably attached to the customer's rate plan and billing profile that traverses through the middleware (e.g., Oracle Application Integration Architecture, "AIA") to the billing system (e.g., Oracle Billing Revenue Management, "BRM") and the Order Orchestration & Service Management (Oracle OSM) that transmits it to the provisioning system so the appropriate provisionable elements are provisioned;
3. The various plans are defined in the Product Catalog to achieve #1 and #2 (for example, for a voice calling plan, the plan details may include the name of the customer, allocated minutes, rate, and payback rate, maximum payback amount);
4. The billing cycle runs monthly, and calculates using the appropriate plan rules engine the utilization of resources (unit of measure). The billing system preferably pulls usage data for the month from the voice and data switches. For example, data usage (e.g., text and email messaging) is obtained from the data interfaces (e.g., SMSC, MMSC) and voice usage is obtain from the voice switch interface (e.g., SCP).
5. The utilized resources are then compared to allocated resources (based on what the customer has subscribed to) for a customer profile to calculate the unutilized balance.
6. This balance is then credited back to the customer's account using the billing discount engine. The credit is given by imputing a monetary value driven by the payback algorithm. The credit can also be given back as a resource if so desired.

7. The credit is displayed on the customer's bill in a desired format either on paper or over the Web.

While certain embodiments of the present invention are described in detail above, the scope of the invention is not to be considered limited by such disclosure, and modifications are possible without departing from the spirit of the invention as evidenced by the following claims:

What is claimed is:

1. A system for providing a credit back to a customer, comprising:
    at least one database, said at least one database configured with service plan details including perishable service units for a first service type allocated to a customer per billing cycle, said at least one database also configured with a payback rate amount for the first service type, and a maximum payback amount for the first service type;
    at least one hardware processing system for tracking the number of used service units for the first service type, said hardware processing system configured to calculate the service units of the first service type remaining at the end of a billing cycle, said hardware processing system configured to calculate a calculated payback amount for the first service type by multiplying the number of remaining service units of the first service type with the payback rate amount for the first service type; and
    wherein said at least one hardware processing system is configured to determine a payback amount for the first service type by taking the smaller of the calculated payback amount for the first service type and the maximum payback amount for the first service type,
    wherein the at least one database is configured with perishable service units for a second service type allocated to a customer per billing cycle, said at least one database also configured with a payback rate amount for the second service type, and a maximum payback amount for the second service type;
    wherein at least one hardware processing system is adapted to track the number of used service units for the second service type, said hardware processing system configured to calculate the service units of the second service type remaining at the end of a billing cycle, said hardware processing system configured to calculate a calculated payback amount for the second service type by multiplying the number of remaining service units of the second service type with the payback rate amount for the second service type; and
    wherein said at least one hardware processing system is configured to determine a payback amount for the second service type by taking the smaller of the calculated payback amount for the second service type and the maximum payback amount for the second service type; and
    wherein said at least one hardware processing system is configured to determine a total payback amount by adding the payback amounts for the first and second service types.

2. A system according to claim 1, further comprising:
    an invoice for the customer with a credit applied in the amount of the total payback amount.

3. A system according to claim 1, wherein the second service type is text messaging.

4. A system according to claim 1, wherein the second service type is email messaging.

5. A system according to claim 1, wherein the second service type is Internet services.

6. The system according to claim 1, wherein the first service type is voice calling services and the service units of the first service type is voice minutes.

7. A method for providing a credit back to a customer, comprising the steps of:
    providing a service of a first service type to a customer, the service usage measured by first service units;
    storing service plan details for a customer in at least one database, including the number of perishable service units for the first service type allocated to a customer per billing cycle;
    storing a payback rate amount for the first service type;
    storing a maximum payback amount for the first service type;
    storing the number of used service units for the first service type;
    calculating the remaining service units of the first service type remaining at the end of the billing cycle;
    calculating a calculated payback amount for the first service type by multiplying the number of remaining service units of the first service type with the payback rate amount for the first service type;
    determining a payback amount for the first service type by taking the smaller of the calculated payback amount for the first service type and the maximum payback amount for the first service type;
    applying the payback amount for the first service type on a customer's invoice as a credit;
    providing a service of a second service type to a customer, the service usage measured by second service units;
    storing the number of perishable service units for the second service type allocated to a customer per billing cycle;
    storing a payback rate amount for the second service type;
    storing a maximum payback amount for the second service type;
    storing the number of used service units for the second service type;
    calculating the remaining service units of the second service type remaining at the end of the billing cycle;
    calculating a calculated payback amount for the second service type by multiplying the number of remaining service units of the second service type with the payback rate amount for the second service type;
    determining a payback amount for the second service type by taking the smaller of the calculated payback amount for the second service type and the maximum payback amount for the second service type;
    calculating a total payback amount by adding the payback amounts for the first and second service types; and
    applying the total payback amount for the first service type on a customer's invoice as a credit.

8. A method according to claim 7, wherein the first service type is voice calling services and the service units of the first type is voice minutes.

9. A method according to claim 7, wherein the second service type is text messaging.

10. A method according to claim 7, wherein the second service type is email messaging.

11. A method according to claim 7, wherein the second service type is Internet services.

12. A system for providing a credit back to a customer, comprising:
    at least one database, said at least one database configured with service plan details including perishable service units for a first service type allocated to a customer per billing cycle, said at least one database also configured with a payback rate amount for the first service type, and a maximum payback amount for the first service type;

at least one hardware processing system for tracking the number of used service units for the first service type, said hardware processing system configured to calculate the service units of the first service type remaining at the end of a billing cycle, said hardware processing system configured to calculate a calculated payback amount for the first service type by multiplying the number of remaining service units of the first service type with the payback rate amount for the first service type;

wherein said at least one hardware processing system is configured to determine a payback amount for the first service type by taking the smaller of the calculated payback amount for the first service type and the maximum payback amount for the first service type;

wherein the first service type is voice calling services and the service units of the first service type is voice minutes;

wherein the at least one database is configured with perishable service units for a second service type allocated to a customer per billing cycle, said at least one database also configured with a payback rate amount for the second service type, and a maximum payback amount for the second service type;

wherein at least one hardware processing system is adapted to track the number of used service units for the second service type, said hardware processing system configured to calculate the service units of the second service type remaining at the end of a billing cycle, said hardware processing system configured to calculate a calculated payback amount for the second service type by multiplying the number of remaining service units of the second service type with the payback rate amount for the second service type; and wherein said at least one hardware processing system is configured to determine a payback amount for the second service type by taking the smaller of the calculated payback amount for the second service type and the maximum payback amount for the second service type;

wherein said at least one hardware processing system is configured to determine a total payback amount by adding the payback amounts for the first and second service types; and wherein said system is further comprised of an invoice for the customer with a credit applied in the amount of the total payback amount.

13. A system according to claim 12, wherein the second service type is text messaging.

14. A system according to claim 12, wherein the second service type is email messaging.

15. A system according to claim 12, wherein the second service type is Internet services.

* * * * *